United States Patent
Wan et al.

(10) Patent No.: US 10,404,720 B2
(45) Date of Patent: *Sep. 3, 2019

(54) METHOD AND SYSTEM FOR IDENTIFYING A HUMAN OR MACHINE

(71) Applicant: Alibaba Group Holding Limited, George Town (KY)

(72) Inventors: Chaoxin Wan, Hangzhou (CN); Xingguo Wei, Hangzhou (CN); Songying Lin, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,804

(22) Filed: Jan. 30, 2018

(65) Prior Publication Data

US 2018/0270253 A1 Sep. 20, 2018

Related U.S. Application Data

(63) Continuation of application No. 15/093,251, filed on Apr. 7, 2016, now Pat. No. 9,917,848.

(30) Foreign Application Priority Data

Apr. 21, 2015 (CN) .......................... 2015 1 0191030

(51) Int. Cl.
| | | |
|---|---|---|
| *H04L 29/06* | (2006.01) | |
| *G06N 20/00* | (2019.01) | |
| *G06N 20/10* | (2019.01) | |
| *G06F 21/31* | (2013.01) | |
| *G06F 21/55* | (2013.01) | |

(52) U.S. Cl.
CPC .......... *H04L 63/126* (2013.01); *G06F 21/316* (2013.01); *G06F 21/55* (2013.01); *G06N 20/00* (2019.01); *G06N 20/10* (2019.01); *H04L 63/102* (2013.01); *H04L 63/1408* (2013.01); *G06F 2221/2133* (2013.01)

(58) Field of Classification Search
None
See application file for complete search history.

(56) References Cited

U.S. PATENT DOCUMENTS

| 7,370,050 B2 | 5/2008 | Hunter |
|---|---|---|
| 8,352,598 B2 | 1/2013 | Nyang |

(Continued)

FOREIGN PATENT DOCUMENTS

| CN | 1517889 | 8/2004 |
|---|---|---|
| CN | 101833619 | 9/2010 |

(Continued)

*Primary Examiner* — Ali Shayanfar
(74) *Attorney, Agent, or Firm* — Van Pelt, Yi & James LLP

(57) ABSTRACT

Identifying a human or machine is disclosed including sending a currently-triggered human or machine identification request to a server, receiving a first operation rendered by the server in response to the human or machine identification request, the first operation being configured to identify a human or machine and expressing an operation track for identifying the human or machine, and sending a second operation that was triggered in response to the first operation to the server to identify the human or machine on a triggering entity for the second operation based on a behavior characteristic model that was set in advance.

13 Claims, 16 Drawing Sheets

(56) References Cited

U.S. PATENT DOCUMENTS

| | | | |
|---|---|---|---|
| 8,669,846 B2* | 3/2014 | Warner | H04Q 9/00 |
| | | | 340/10.1 |
| 8,683,582 B2 | 3/2014 | Rogers | |
| 8,831,282 B2 | 9/2014 | Guan | |
| 9,015,847 B1* | 4/2015 | Kaplan | H04L 63/1433 |
| | | | 726/25 |
| 9,183,362 B2* | 11/2015 | Thompson | G06F 21/31 |
| 9,225,531 B2* | 12/2015 | Hachey | H04L 9/3271 |
| 9,516,053 B1* | 12/2016 | Muddu | H04L 63/1425 |
| 2005/0008148 A1 | 1/2005 | Jacobson | |
| 2006/0093189 A1 | 5/2006 | Kato | |
| 2007/0026372 A1* | 2/2007 | Huelsbergen | G09B 3/00 |
| | | | 434/322 |
| 2007/0150954 A1 | 6/2007 | Shon | |
| 2008/0086524 A1 | 4/2008 | Afergan | |
| 2009/0150156 A1* | 6/2009 | Kennewick | G06Q 30/0261 |
| | | | 704/257 |
| 2009/0319270 A1* | 12/2009 | Gross | G10L 15/22 |
| | | | 704/246 |
| 2010/0234246 A1* | 9/2010 | Jung | C40B 50/02 |
| | | | 506/18 |
| 2010/0333037 A1* | 12/2010 | Pavlovski | G06F 3/0481 |
| | | | 715/848 |
| 2011/0320816 A1 | 12/2011 | Yao | |
| 2012/0246737 A1 | 9/2012 | Paxton | |
| 2012/0284781 A1 | 11/2012 | Gentner | |
| 2013/0132093 A1 | 5/2013 | Gross | |
| 2013/0179958 A1 | 7/2013 | Fujiwara | |
| 2014/0259138 A1* | 9/2014 | Fu | H04L 63/083 |
| | | | 726/7 |
| 2014/0300554 A1 | 10/2014 | Samuel | |
| 2014/0317030 A1* | 10/2014 | Shen | G06N 3/006 |
| | | | 706/12 |
| 2014/0337930 A1* | 11/2014 | Hoyos | H04L 63/10 |
| | | | 726/4 |
| 2014/0373139 A1 | 12/2014 | Fu | |

FOREIGN PATENT DOCUMENTS

| | | |
|---|---|---|
| CN | 103530543 | 1/2014 |
| CN | 104301286 | 1/2015 |
| JP | 04156610 | 5/1992 |
| JP | 2013254468 | 12/2013 |
| JP | 2014222392 | 11/2014 |

* cited by examiner

1300

400

700

900

METHOD AND SYSTEM FOR IDENTIFYING A HUMAN OR MACHINE

CROSS REFERENCE TO OTHER APPLICATIONS

This application is a continuation of co-pending U.S. patent application Ser. No. 15/093,251, entitled METHOD AND SYSTEM FOR IDENTIFYING A HUMAN OR MACHINE, filed Apr. 7, 2016 which is incorporated herein by reference for all purposes, which claims priority to People's Republic of China Patent Application No. 201510191030.X entitled A HUMAN OR MACHINE METHOD AND DEVICE AND A METHOD AND A DEVICE FOR COLLECTING BEHAVIORAL CHARACTERISTIC DATA, filed Apr. 21, 2015 which is incorporated herein by reference for all purposes.

FIELD OF THE INVENTION

The present application relates to a method and a system for identifying a human or machine.

BACKGROUND OF THE INVENTION

The Turing test is a test devised by Alan Turing in 1950 for determining whether a machine can think. The Turing test tested whether a machine could exhibit intelligence that is equivalent to, or indistinguishable from the intelligence of a human. The Completely Automated Public Turing Test to Tell Computers and Humans Apart (CAPTCHA) test is often regarded as a type of reverse Turing test, which is a test administered by a computer to detect whether the party providing the answer to a question is a human or a machine. Since a computer is often unable to answer a CAPTCHA question, a party that provides the correct answer to the question can be regarded as a human. For example, the computer presents a twisted image that includes a verification code, which a human or a machine attempts to recognize. A party who can recognize the verification code correctly is determined to be a human. A party who cannot recognize the verification code is determined to be a machine.

BRIEF DESCRIPTION OF THE DRAWINGS

Various embodiments of the invention are disclosed in the following detailed description and the accompanying drawings.

In order to describe more clearly the technical schemes in the embodiments of the present application, the drawings needed to describe embodiments are explained briefly below. Obviously, the drawings described below are only some embodiments of the present application. A person with ordinary skill in the art could, without expending inventive effort, acquire other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application discloses a behavioral characteristic model that is trained through machine learning, and using the behavior characteristic model to identify humans or machines.

Figure 1A:
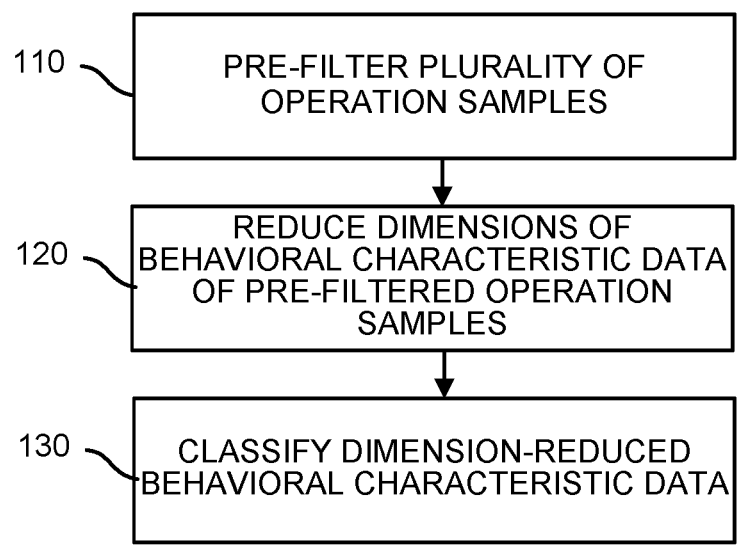
FIG. 1A is a flowchart of an embodiment of a process for training a behavioral characteristic model.

FIG. 1A is a flowchart of an embodiment of a process for training a behavioral characteristic model. In some embodiments, the process 100 is implemented by a server 910 of FIG. 9 and comprises:

In 110, a plurality of operation samples are pre-filtered based on an operation movement speed and degree of operation randomness of the plurality of operation samples. The degree of operation randomness corresponds to up-and-down flutters of an operation sample track.

First, in this example, the server acquires a set of operating samples. For example, the server randomly selects 100 stored operation samples of pre-existing operating actions stored in a database. The pre-existing operations can include user gestures that a server previously responded to, or machine behavior that a server previously rejected. The operation samples (e.g., selected ones) of these pre-existing operating actions can be used to train the behavioral characteristic model.

The operation data format shown in Table 1 below illustrates an example data format that is recorded and can be extracted from a database storing operation data associated with operating actions:

TABLE 1

| Type of Information | Content |
| --- | --- |
| Equipment information | Browser/application information, operating system, hardware information, etc. |
| Behavior information | Mouse movement, mouse click, user-pressed key, etc. |

Regarding the equipment information field in Table 1, the browser/application information could correspond to which version of browser or standalone application is used for the corresponding operation sample when the operation sample is triggered. The operating system could indicate what type and/or version of operating system, e.g., Android 6 or Windows 10, is used for the corresponding operation sample in the event that the operation sample is triggered. The hardware information could represent information such as the International Mobile Equipment Identity (IMEI) number of the mobile terminal or the Internet Protocol (IP) address of the computer for the corresponding operation sample in the event that the operation sample is triggered. Regarding the behavior information field in Table 1, the mouse movement could correspond to a mouse cursor position track for the corresponding operation sample in the event that the operation sample is triggered. The mouse click could correspond to click-position information of the mouse on the display screen for the corresponding sample when the mouse click is triggered. "User-pressed key" could correspond to which keys were pressed by the user on the touchscreen for the corresponding sample in the event that the keys were triggered. In other embodiments, more than the above types of operation data can be stored in the server database. Table 1 merely provides illustrative examples.

The behavioral characteristic data of extracted operation samples is extracted from the behavior information field in Table 1. Table 2 illustrates content of the behavioral characteristic data:

TABLE 2

| Name of Characteristic | Description of Characteristic |
| --- | --- |
| Operative slide time length | Total length of time that the operation sample is being operated |
| Operative slide time length of each segment T(i) | Divide operation track into N segments; the time length of the $i^{th}$ track segment is T(i). |
| Center line-deviation frequency of each segment O(i) | Divide operation track into N segments; the number of deviations from the central axis of the $i^{th}$ track segment is O(i). |
| Average deviation distance of each segment OV(i) | Divide operation track into N segments; the average distance of deviations from the central axis of the $i^{th}$ track segment is OV(i). |
| Initial position of the operation when triggered D(x, y) | The starting point coordinates of the operation track are D(x, y). |
| Terminal position of the operation when released U(x, y) | The ending point coordinates of the operation track are U(x, y). |

In Table 2, the operative slide time length can refer to the total time that the corresponding operation sample is being operated (also referred to as the total operation time). For example, the total time the user spent moving a mouse cursor or dragging a slider. In some embodiments, dividing the time length into N segments is possible and the values of N can be from 20 to 50. Another value of N can be set based on actual need. Therefore, the time length T(i) of each segment corresponds to a time length of an ith track segment. The ith track segment refers to one of the N segments. The center line-deviation frequency O(i) of each segment is calculated as follows: after dividing the operation track into N segments, the number of deviations from the central axis of the ith track segment is O(i), where one track flutter, either up or down, in the operation track can be regarded as one deviation from the central axis, and the central axis corresponds to the central axis of the operation track. The average deviation distance of each segment OV(i) is calculated as follows: divide the operation track into N segments, the average distance of deviations from the central axis of the ith track segment being OV(i). Here, the central axis refers to an axis that is located at the center of the slider. The initial position D(x,y) in the event that the operation is triggered corresponds to the starting point of the operation track, and the final position U(x,y) in the event that the operation is released corresponds to the ending point of the operation track. For example, the initial position D(x,y) can correspond to the starting position of the mouse cursor when the user begins to move the cursor, and the final position U(x,y) can correspond to the final position of the mouse cursor when the user stops moving the cursor.

Please note that the behavioral characteristic data in Table 2 is merely exemplary. Moreover, as an example, an operation could select one type of behavioral characteristic data in Table 2 for human-or-machine identification. In another example, an operation could select any combination of behavioral characteristic data in Table 2 for human-or-machine identification. In one example, the operative slide time length alone is selected as the behavioral characteristic data. In other examples, the operative slide time length of each segment, the center line-deviation frequency of each segment, or the average deviation distance of each segment is selected as the behavioral characteristic data. In yet another example, the operation triggering initial position and the operation triggering terminal position are selected as the behavioral characteristic data. The technique described herein does not limit the types of the behavioral characteristic data. The quantity of behavioral characteristic data categories or the selection of behavioral characteristic data does not affect the implementation of process 100.

The operative slide time length corresponds to the total time length of a valid operation of the operation sample. The operative slide time length of each segment is obtained by dividing the total operation time of the operation sample into several equal segments and calculating the operative time length of each segment. The center line-deviation frequency of each segment is obtained by dividing the total operation time of the operation sample into several equal segments and calculating the number of operative deviations from the center line for each segment. For example, the number of operative deviations is calculated based on the distance that the user's mouse pointer deviates from the center line of the slider. The average deviation distance of each segment is obtained by dividing the total operation time of the operation sample into several equal segments and calculating the operative distance deviation from the center axis for each segment. The coordinates in the event that the operation sample begins to undergo triggering, e.g. a mouse click, can correspond to the operation triggering initial position, and the coordinates when the operation sample ceases to undergo triggering can correspond to the operation triggering terminal position.

Next, after the behavioral characteristic data of the operation samples is extracted, operation samples are pre-filtered based on the movement speed and the degree of operation randomness of the operation samples. The operation movement speed indicates the track movement speed of the operation sample. In the event that the operation movement speed is too fast (e.g., greater than a first threshold), or in the event that the operation movement time is short (e.g., less than a second threshold), then the operation sample can be considered machine behavior. For example, in the event that the operation movement time is 100 ms or less, the corresponding operation sample is regarded as machine behavior. Accordingly, such an operation sample is filtered out. The degree of operation randomness corresponds to up-and-down flutters of the operation sample track. For example, if an operation sample basically has no up-down flutters, then the operation sample is also to be regarded as machine behavior, and the operation sample is to be filtered out.

In 120, the server reduces dimensions of the behavioral characteristic data of the pre-filtered operation samples based on a principal components analysis (PCA) technique.

To reduce the dimensions of the behavioral characteristic data of the pre-filtered operation sample, the principal component analysis (PCA) is employed. As a result, the behavioral characteristic data has a reduction in the number of dimensions, which facilitates subsequent support vector machine (SVM) classification. PCA is a well-known data mining and statistical technique. Operative slide time length is an example of a dimension of the behavioral characteristic data.

Figure 1B:
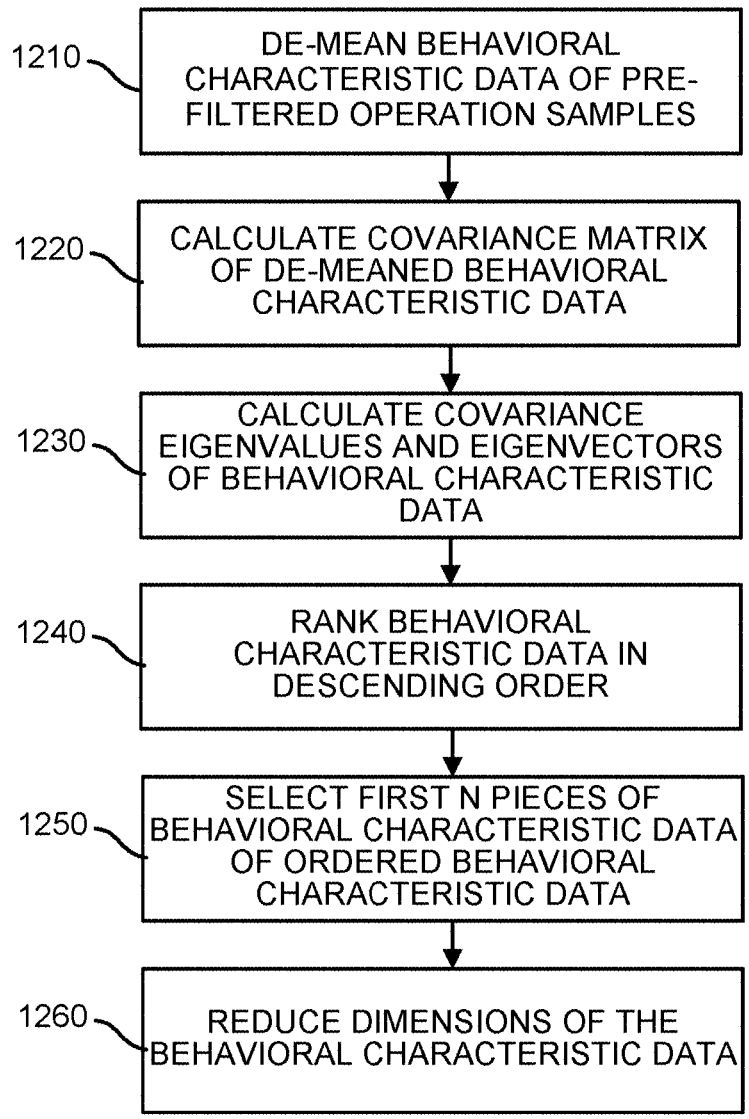
FIG. 1B is a flowchart of an embodiment of a process for reducing dimensions of behavioral characteristic data of pre-filtered operation samples.

FIG. 1B is a flowchart of an embodiment of a process for reducing dimensions of behavioral characteristic data of pre-filtered operation samples. In some embodiments, the process 1200 is an implementation of operation 120 of FIG. 1A and comprises:

In 1210, the server de-means the behavioral characteristic data of the pre-filtered operation samples.

The behavioral characteristic data of the pre-filtered operation samples is de-meaned. For example, an empirical mean vector is subtracted from the behavioral characteristic data to obtain de-meaned behavioral characteristic data. For example, assume that each of [ai bi ci . . . mi] corresponds to one operation behavior vector of an operation performed by a user i, and m indicates different types of behavior characteristics in one operation performed by user i. Examples of behavior characteristics are shown in Table 2. Vector elements ai, bi, etc. can correspond to the operative slide time length of segments, center line-deviation frequency of the segments, etc., and each vector element is a single value. Also assume that a total of n users exist. Next, by averaging the operation behavior vectors of each type for n users, the vector relating to [$\bar{a}$ $\bar{b}$ . . . $\bar{n}$] is obtained. Then, the mean of each type of the operation behavior vectors can be used to normalize the operation behavior vectors. The result is the matrix Y shown below:

$$Y = \begin{bmatrix} a1 & a2 & a3 & \ldots & an \\ b1 & b2 & b3 & \ldots & bn \\ \ldots & \ldots & \ldots & \ldots & \ldots \\ m1 & m2 & m3 & \ldots & mn \end{bmatrix}$$

In 1220, the server calculates a covariance matrix of the de-meaned behavioral characteristic data.

The covariance matrix is calculated for the de-meaned behavior characteristic data. The covariance matrix can be calculated based on formula (I) below:

$$C = \frac{1}{n}YY^T \qquad (I)$$

where n is the number of users, and Y is the matrix calculated in operation 1210.

In 1230, the server calculates covariance eigenvalues and eigenvectors of the behavioral characteristic data based on the covariance matrix using standard, known techniques.

Subsequently, the covariance matrix C calculated in operation 1220 is used to calculate the covariance eigenvalues and eigenvectors of the behavioral characteristic data.

In 1240, the server ranks the behavioral characteristic data in descending order based on the covariance eigenvalues.

In 1250, the server selects the first N pieces of behavioral characteristic data of the ranked behavioral characteristic data as a dimension-reducing matrix P, where N is an integer greater than or equal to 1.

In 1260, the server reduces the dimensions of the behavioral characteristic data based on the dimension-reducing matrix.

The server, based on the dimension-reducing matrix P of operation 1250, reduces the dimensions of the behavioral data based on the formula "Z=PX," where X is raw data corresponding to the matrix Y in operation 1210, and Z is the dimension-reduced behavioral characteristic data.

Returning to FIG. 1A, in 130, the server, based on a support vector machine (SVM) technique, classifies the dimension-reduced behavioral characteristic data to obtain a classifier having first behavioral characteristic vectors that relate to human behavior and second behavioral characteristic vectors that relate to machine behavior. In an SVM, a classifier is trained based on training data (e.g., behavior characteristic vectors that are labeled as either human behavior or machine behavior) to obtain an optimal hyperplane that separates different types of input vectors. Once the classifier is trained, unlabeled dimension-reduced behavioral characteristic data can be input into the trained classifier to be labeled (or equivalently, classified). How to perform training and implement the SVM is described below in connection with FIG. 1C.

Following the dimension reduction performed in operation 120, the server classifies the dimension-reduced behavioral characteristic data based on the SVM and thus obtains two types of behavior characteristic data. One type of behavior characteristic data corresponds to behavior characteristic data that conforms to human behavior and is classified as human behavior. The other type corresponds to behavioral characteristic data that conforms to machine behavior and is classified as machine behavior.

Figure 1C:
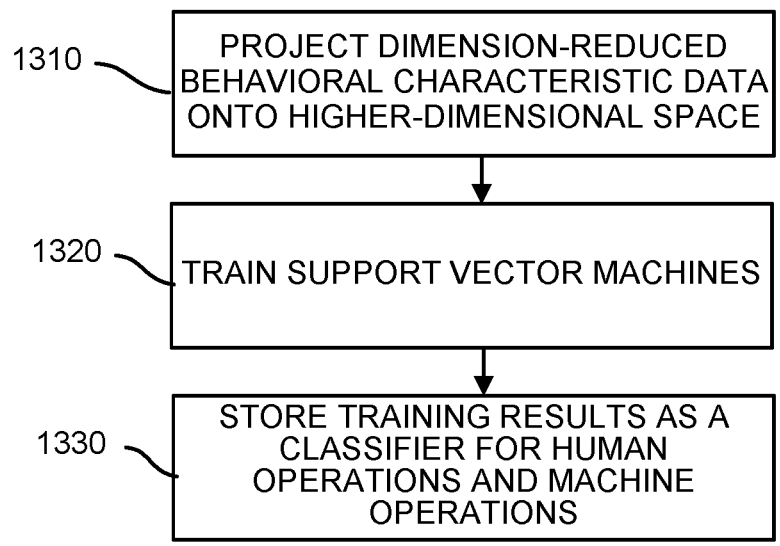
FIG. 1C is a flowchart of an embodiment of a process for classifying dimension-reduced behavioral characteristic data to obtain a classifier having first behavioral characteristic vectors and second behavioral characteristic vectors.

FIG. 1C is a flowchart of an embodiment of a process for classifying dimension-reduced behavioral characteristic data to obtain a classifier having first behavioral characteristic vectors and second behavioral characteristic vectors. In some embodiments, the process 1300 is an implementation of 130 of FIG. 1A and comprises:

In 1310, the server projects dimension-reduced behavioral characteristic data onto a higher-dimensional space based on a mapping function. An example of a mapping function is a kernel function.

The kernel function, which is used here, is a Gaussian kernel function. The Gaussian kernel function is as shown in formula (II):

$$k(x1, x2) = \exp\left(-\frac{|x1-x2|^2}{2\delta^2}\right) \quad (II)$$

A Gaussian kernel function-based classification function is as shown in formula (III):

$$f(x) = \sum_{i=1}^{n} \alpha_i^* y_i K(x_i, x) + b \quad (III)$$

In 1320, the server trains support vector machines based on sample data of the projected behavioral characteristic data.

Assume that the sample data corresponds to the set {Xi, Zi}, where Xi is behavioral characteristic data, and Zi is {−1,1}, where −1 indicates that the operation sample corresponding to a behavioral characteristic vector is a machine operation, and 1 indicates that the operation sample corresponding to a behavioral characteristic vector is a human operation. Known techniques such as logistic regression can be used to perform training of the classifier.

In 1330, the server stores training results as a classifier for human operations and machine operations.

After performing operation 1320, the server can obtain an optimal classifying hyperplane comprising α, b, and support vectors and store the optimal classifying hyperplane as a classifier for human operations and machine operations to facilitate binarized classification of subsequently collected behavioral characteristic data.

In some embodiments, the classifying of the dimension-reduced behavioral characteristic data includes binarizing (e.g., true or false, 1 or 0, etc.) the dimension-reduced behavioral characteristic data to obtain a binarized image of the dimension-reduced behavioral characteristic data, extracting binarized characteristics of the dimension-reduced behavioral characteristic data from the binarized image, formatting the binarized characteristics based on an SVM format to obtain formatted binarized characteristics, and training, based on preset SVM parameters, a classifier that classifies the formatted binarized characteristics into: first behavioral characteristic data conforming to the human behavior and second behavioral characteristic data conforming to the machine behavior.

Figure 2A:
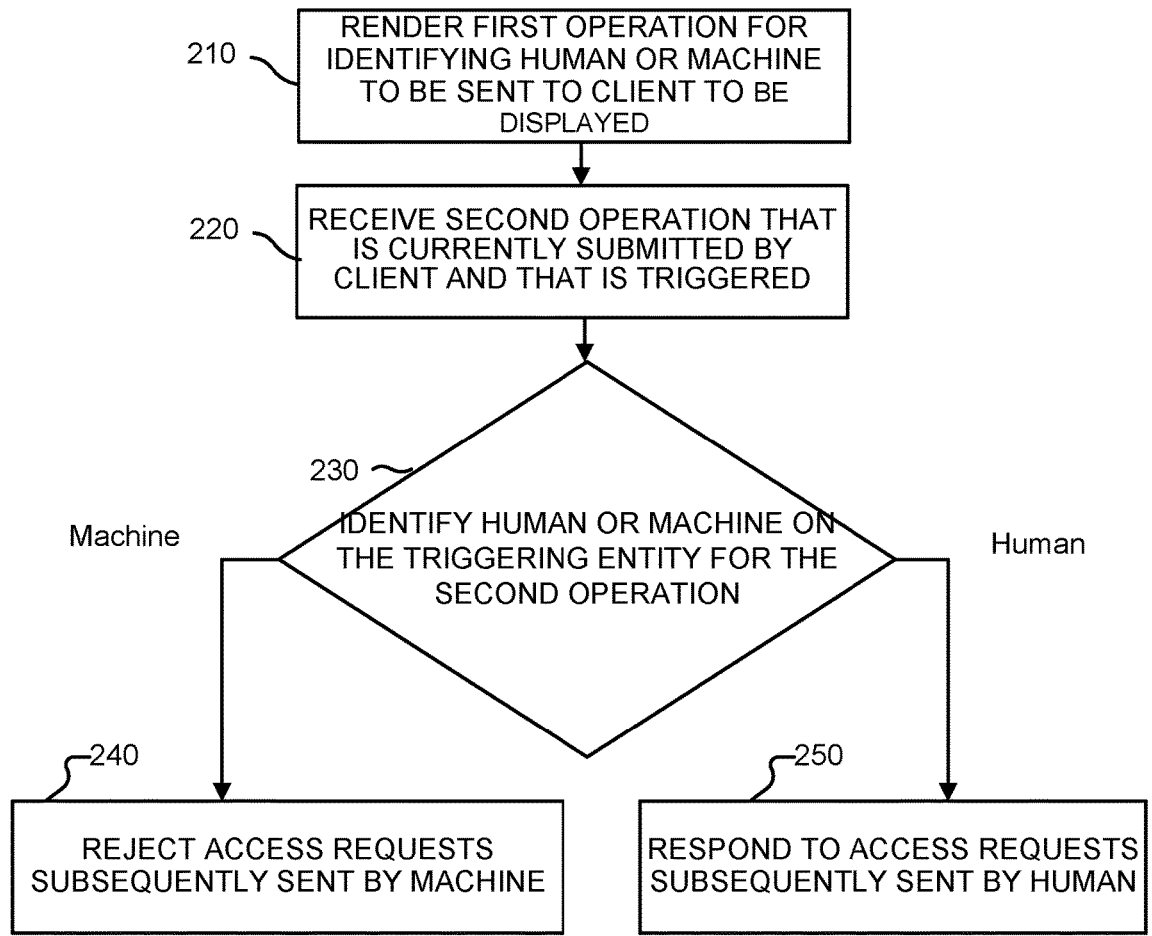
FIG. 2A is a flowchart of an embodiment of a process for identifying a human or machine.

After completing the initiation of the training process for the behavioral characteristics model, the human-or-machine identification process can be performed. FIG. 2A is a flowchart of an embodiment of a process for identifying a human or machine. In some embodiments, the process 200 is implemented by the server 910 of FIG. 9 and comprises:

In 210, in the event that a human or machine identification request is received from a client, the server renders a first operation for identifying a human or machine to be sent to the client to be displayed.

The process 200 can be applied to a server for identifying a human or machine and identifying human or machine on operations submitted by clients connected to the server. In some embodiments, using an Alipay example, the use of an Alipay wallet by users often involves monetary operations such as account transfers or payments. Therefore, in some embodiments, identifying whether an operation submitted by a client was performed by a human user or a machine is to be performed. The identification is to be performed because an operation submitted by a machine is likely by a malicious program such as posing to be the user. In some embodiments, after the client submits an account transfer operation, the server presents a first operation for identifying a human or machine. For example, an operation track that requires the user to perform an operation (e.g. first operation) is sent to the client to be displayed. For example, an account transfer operation is one type of human or machine identification request. Of course, setting in advance which operations submitted by the client are the human or machine identification requests is possible. When the operation submitted by the client corresponds to a human or machine identification request, a first operation is rendered, and the first operation is sent to the client to be displayed.

In some embodiments, in the case of the Web (which can include personal computer (PC) web pages and mobile terminal browser web pages), an interactive operation can be rendered by JavaScript on a server to be displayed. In an example of wireless apps used by users on mobile terminals (which can include application scenarios under Android operating systems and iOS systems), interactive operations can be rendered by Java (Android) or Objective C (iOS) on a server to be displayed. In one example, a track (e.g., a line, a bar, etc.) is displayed to the user, and the interactive operation that the user is required to perform to prove that he is human includes sliding his finger across the track on a touchscreen or moving a mouse cursor across the track on a display to "unlock" the track. In another example, a track, a ball, and a basket are displayed to the user, and the interactive operation to be performed to prove that the user is human includes dragging the ball into the basket following the track.

In 220, the server receives a second operation that is currently submitted by the client and that is triggered based on an operation track depicted by the first operation.

After the server sends the first operation to the client to be displayed, the server is to then receive a second operation submitted by the client and triggered or performed by the user or a machine simulating the operation track presented by the first operation. The server determines whether the triggering entity for the second operation (i.e., the party that performed the second operation and caused data associated with the second operation to be sent to the server) is human or machine based on behavioral characteristics of the second operation.

In 230, the server identifies a human or machine on the triggering entity for the second operation based on a behavior characteristic model that was trained in advance. In some embodiments, the behavior characteristic model corresponds to: a classifier for human operations and machine operations that is trained based on operation samples.

Figure 2B:
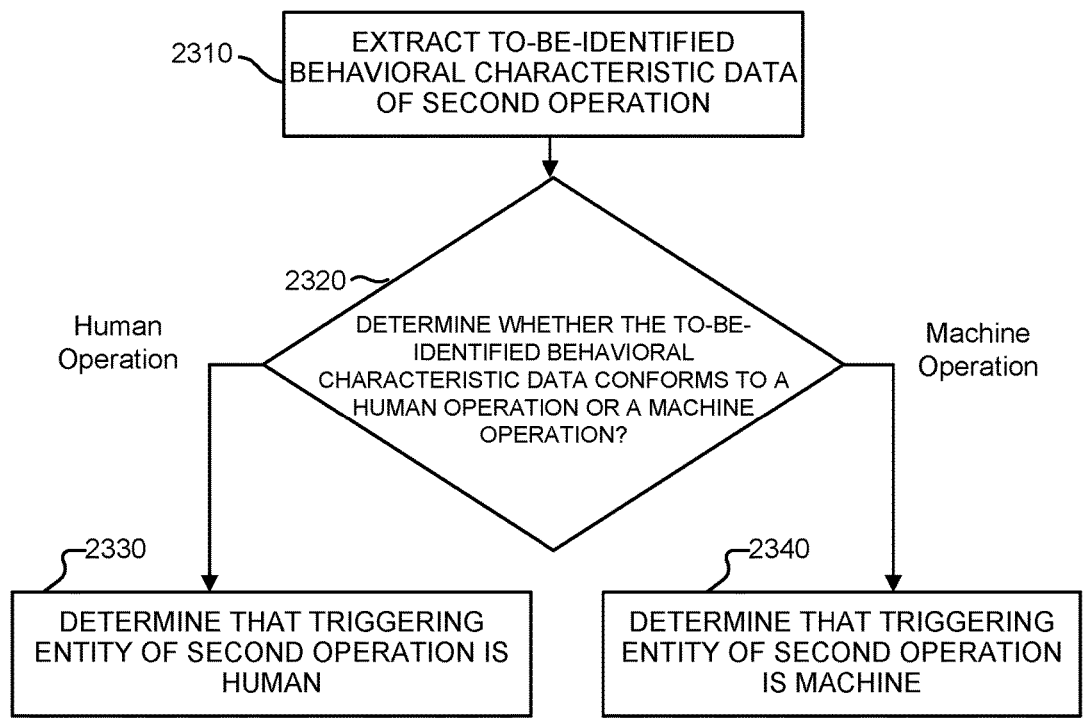
FIG. 2B is a flowchart of an embodiment of a process for using a preset behavioral characteristics model to identify a human or machine.

FIG. 2B is a flowchart of an embodiment of a process for using a preset behavioral characteristics model to identify a human or machine. In some embodiments, the process 2300 is an implementation of operation 230 of FIG. 2A and comprises:

In 2310, the server extracts the to-be-identified behavioral characteristic data of the second operation.

After the server receives the second operation submitted by the client, the server first extracts the behavioral characteristic data of the second operation from the second operation. The extraction of the to-be-identified behavioral characteristic data can be performed in a manner similar to the extraction of the behavioral characteristic data performed in process 100 of FIG. 1A. The operation samples for the behavioral characteristic model illustrate how the behavioral characteristic data is to be extracted. The subsequent second operation can also use the same approach to present the to-be-identified behavioral characteristic data.

In 2320, the server determines whether the to-be-identified behavioral characteristic data conforms to a human operation or a machine operation by applying the to-be-identified behavioral characteristic data to the behavior characteristic model.

In 2330, in the event that the to-be-identified behavioral characteristic data conforms to a human operation, the server determines that the triggering entity of the second operation is human.

Then the server determines whether the behavioral characteristic data extracted in operation 2310 is first behavioral characteristic data in the behavioral characteristic model or second behavioral characteristic data in the behavioral characteristic model. In the event that the extracted behavioral characteristic data corresponds to first behavioral characteristic data, the server determines that the extracted behavioral characteristic data relates to human operation. Accordingly, the triggering entity for the second operation is determined to be a human.

In 2340, in the event that the to-be-identified behavioral characteristic data relates to a machine operation, the server determines that the triggering entity of the second operation is a machine.

In the event that the to-be-identified behavioral characteristic data corresponds to second behavioral characteristic data, the server determines that the extracted behavioral characteristic data corresponds to machine operation. Thus, the triggering entity for the second operation is determined to be a machine.

Referring back to FIG. 2A, in 240, in the event that the result of the human or machine identification is a machine, the server rejects access requests subsequently sent by the machine.

In 250, in the event that the result of the human or machine identification is a human, the server responds to access requests subsequently sent by the human via the client.

In the event that the server identifies the triggering entity for the second operation as a human, the server can normally respond to access requests subsequently sent by the user. As an example, in the event that the server identifies the triggering entity for the second operation as a machine, the server is to consider the current access request as possibly relating to malicious attacks or security problems. The server can reject the access requests subsequently issued by the machine and thus achieve increased network security.

In some embodiments, when the server is to identify a human or machine, the server sends a request to perform the first operation for human or machine identification to the client to be displayed. This first operation can show, for example, an operation track that is used for identifying a human or machine. Then, after the server receives a second operation, which was submitted by the client and was triggered based on the first operation, the server identifies whether the triggering entity for the second operation is human or machine based on a pre-trained behavioral characteristic model. In other words, the server determines whether the triggering entity for the second operation is a human or a machine. For example, when users perform mouse operations or triggering operations, the users have their own characteristics. For example, the users are accustomed to swiping based on a certain speed, cannot avoid wavering during the swiping process, etc. Therefore, second operation behavioral characteristic data submitted by the client can be used to determine whether the second operation was triggered by a human or a machine. Thus, process 200 for identifying a human or machine can be more accurate than conventional processes and thus is able to further increase network security by rejecting machine access requests, but the process 200 also can provide better user experiences because the user can directly perform the second operation based on the first operation.

Figure 3:
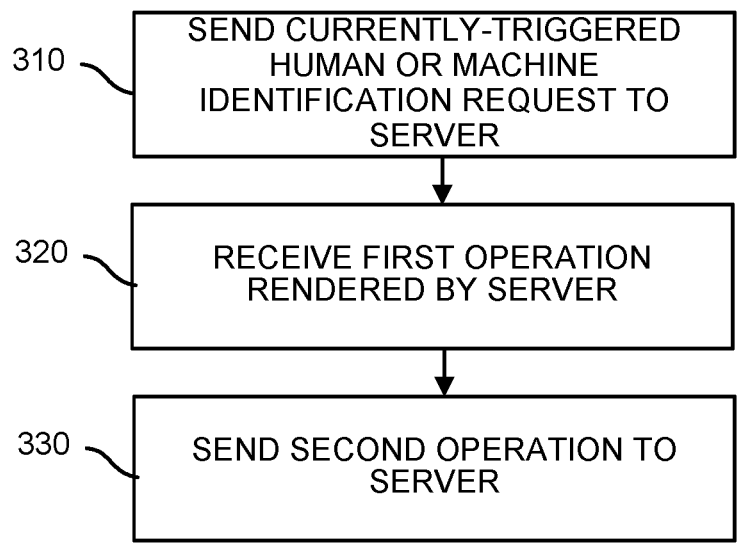
FIG. 3 is a flowchart of an embodiment of a process for collecting behavioral characteristic data.

FIG. 3 is a flowchart of an embodiment of a process for collecting behavioral characteristic data. In some embodiments, the process 300 is implemented by the client 920 of FIG. 9 and comprises:

The client can include an app, a personal computer (PC) application, a browser, a device, etc.

In 310, the client sends a currently-triggered human or machine identification request to a server.

The client collects currently-triggered behavioral characteristic data, i.e., the second operation. First, in some interactive processes (e.g., a shopping cart checkout process) that require identification of a human or machine, in the event that the client receives an interactive request triggered by the user, e.g., a payment operation, the client can send the currently-triggered human or machine identification request to the server.

In 320, the client receives a first operation rendered by the server in response to the human or machine identification request, the first operation being used for identifying a human or machine and expressing an operation track.

After the server receives the human or machine identification request sent by the client, the server renders the first operation for identifying the human or machine. The first operation can present an operation track that is to be simulated or replicated by the client. The first operation is then sent to the client to be displayed.

In 330, the client sends a second operation, which was triggered based on the first operation, to the server to identify a human or machine on the triggering entity for the second operation based on a behavior characteristic model that was set in advance. In some embodiments, the behavior characteristic model corresponds to a classifier for human operations and machine operations that is trained based on operation samples.

After the client displays the first operation, the client sends the second operation, which was triggered based on the operation track presented by the first operation, to the server. The server can then identify a human or machine on the triggering entity for the second operation based on a behavior characteristic model that was set in advance. In some embodiments, the behavior characteristic model includes a classifier for human operations and machine operations that is trained based on operation samples.

The performance of human or machine identification is shown in process 200 of FIG. 2A and will not be repeated here.

In some embodiments, the client triggers the second operation based on the first operation sent by the server, and the first operation can present an operation track for identifying a human or machine. Subsequently, after the client submits the second operation, the server identifies a human or machine on the triggering entity for the second operation based on a pre-trained behavioral characteristic model. In other words, the server determines whether the triggering entity for the second operation is a human or a machine. For example, when users perform mouse operations or triggering operations, the users have their own characteristics. For example, a user may be accustomed to swiping his finger across the screen at a certain speed, cannot avoid tremors during the swiping process, etc. Therefore, the behavioral characteristic data of the second operation submitted by the client can be used to determine whether the second operation was triggered by a human or a machine. Thus, performance of human or machine identification can be more accurately determined than by conventional processes and thus can increase network security by rejecting machine access requests, but can also improve user experiences because the user can directly perform a second operation based on the first operation.

Figure 4:
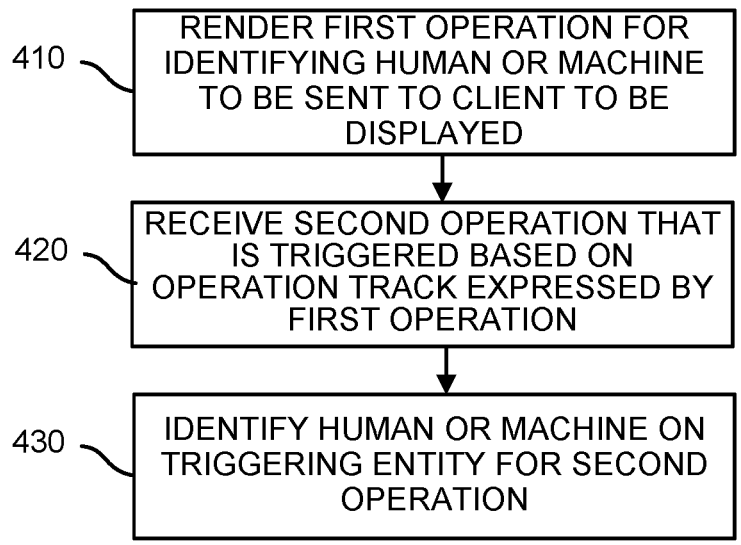
FIG. 4 is a flowchart of another embodiment of a process for identifying a human or machine.

FIG. 4 is a flowchart of another embodiment of a process for identifying a human or machine. In some embodiments, the process 400 is implemented by an independent device or the server 910 of FIG. 9 and comprises:

In 410, in the event that a currently-triggered human or machine identification request is received from a client, the server renders a first operation for identifying a human or machine to be sent to the client to be displayed.

In some embodiments, identifying a human or machine is to be performed where no network exists. Therefore, to ensure accurate human or machine identification where the server or the independent device and the client cannot interact, the process 400 for identifying a human or machine that is applied to independent devices is provided. The independent device can be a computer, a mobile terminal, or another offline device. This independent device can collect behavioral characteristic data for operations that were triggered on the independent device itself. The independent device can then identify a human or machine based on a pre-trained behavioral characteristic model stored on the independent device itself. One example is the technique whereby the first operation is implemented following receipt of the human or machine identification request as described in operation 210 of FIG. 2A, and will not be discussed further for conciseness.

In 420, the server receives a second operation that is triggered based on an operation track expressed by the first operation.

The independent device can display the first operation after rendering the operation track expressed by the first operation. Since the first operation has already presented the operation track that is to be simulated and triggered, the independent device can then receive the second operation after the first operation is simulated and triggered.

In 430, the server identifies a human or machine on the triggering entity for the second operation based on a behavior characteristic model that was set in advance. In some embodiments, the behavior characteristic model includes a classifier for human operations and machine operations that is trained based on operation samples.

The independent device extracts to-be-identified behavioral characteristic data from the second operation. Moreover, relating to a pre-trained behavioral characteristic model, the server identifies a human or machine on the triggering entity for the second operation. In some embodiments, the behavior characteristic model is: a classifier for human operations and machine operations that is trained based on operation samples. Regarding the identifying of the human or machine operation, the identifying of the human or machine operation is described in process 200 of FIG. 2A, and will not be discussed further for conciseness.

In some embodiments, the triggering of the second operation is performed based on the first operation, and the first operation presents an operation track for the identifying of a human or machine. Subsequently, the server, based on the pre-trained behavioral characteristic model, identifies a human or machine on the triggering entity for the second operation. In other words, the server determines whether the triggering entity for the second operation is a human or a machine. For example, in the event that users perform mouse operations or triggering operations, the users have their own characteristics. For example, the users are accustomed to swiping based on a certain speed, cannot avoid wavering during the swiping process, etc. Therefore, the second operation behavioral characteristic data can be used to determine whether the second operation was triggered by a human or a machine. Thus, identification of human or machine can be performed more accurately than conventional processes and thus further increase network security by rejecting machine access requests, but can also improve user experiences because the user can directly trigger a second operation based on the first operation.

Regarding the processes described above, the processes have been expressed as a combination of a series of operations. However, persons skilled in the art understand that the processes are not limited by the operations described, because certain operations can be performed in other sequences or simultaneously. Furthermore, persons skilled in the art should also know the operations and modules involved therein are not necessarily required.

Figure 5A:
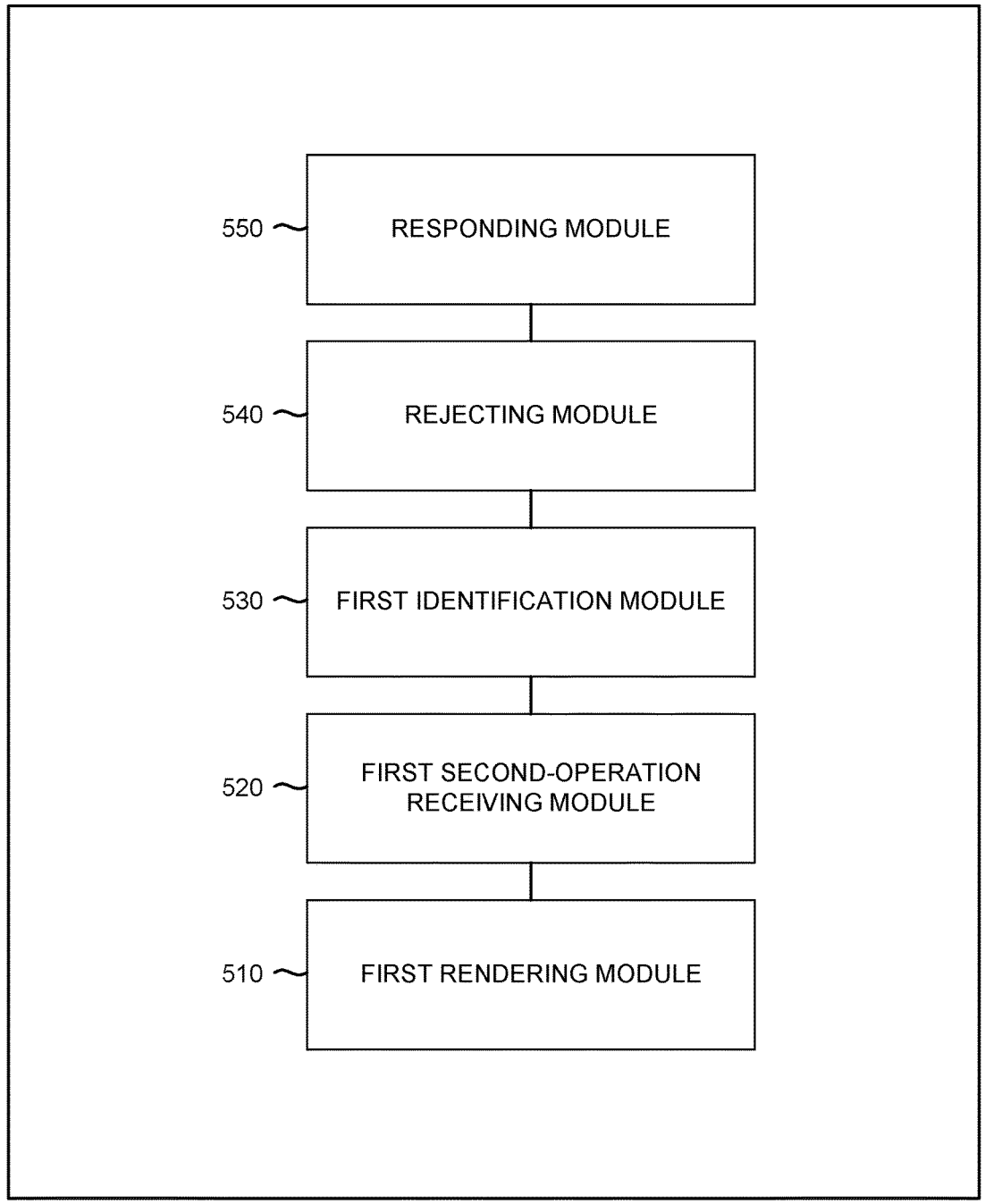
FIG. 5A is a structural block diagram of an embodiment of a device for identifying a human or machine.

FIG. 5A is a structural block diagram of an embodiment of a device for identifying a human or machine. In some embodiments, the device 500 is configured to perform process 200 of FIG. 2A and comprises: a first rendering module 510, a first second-operation receiving module 520, a first identification module 530, a rejecting module 540, and a responding module 550.

In some embodiments, in response to a human or machine identification request sent by a client, the first rendering module 510 is configured to render a first operation for identifying a human or machine to be sent to the client to be displayed.

In some embodiments, the first second-operation receiving module 520 is configured to receive a second operation that is currently submitted by the client and that is triggered based on an operation track expressed by the first operation.

In some embodiments, the first identification module 530 is configured to identify a human or machine on the triggering entity for the second operation based on a behavior characteristic model that was set in advance. In some embodiments, the behavior characteristic model is: a classifier for human operations and machine operations that is trained based on operation samples.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 5B:
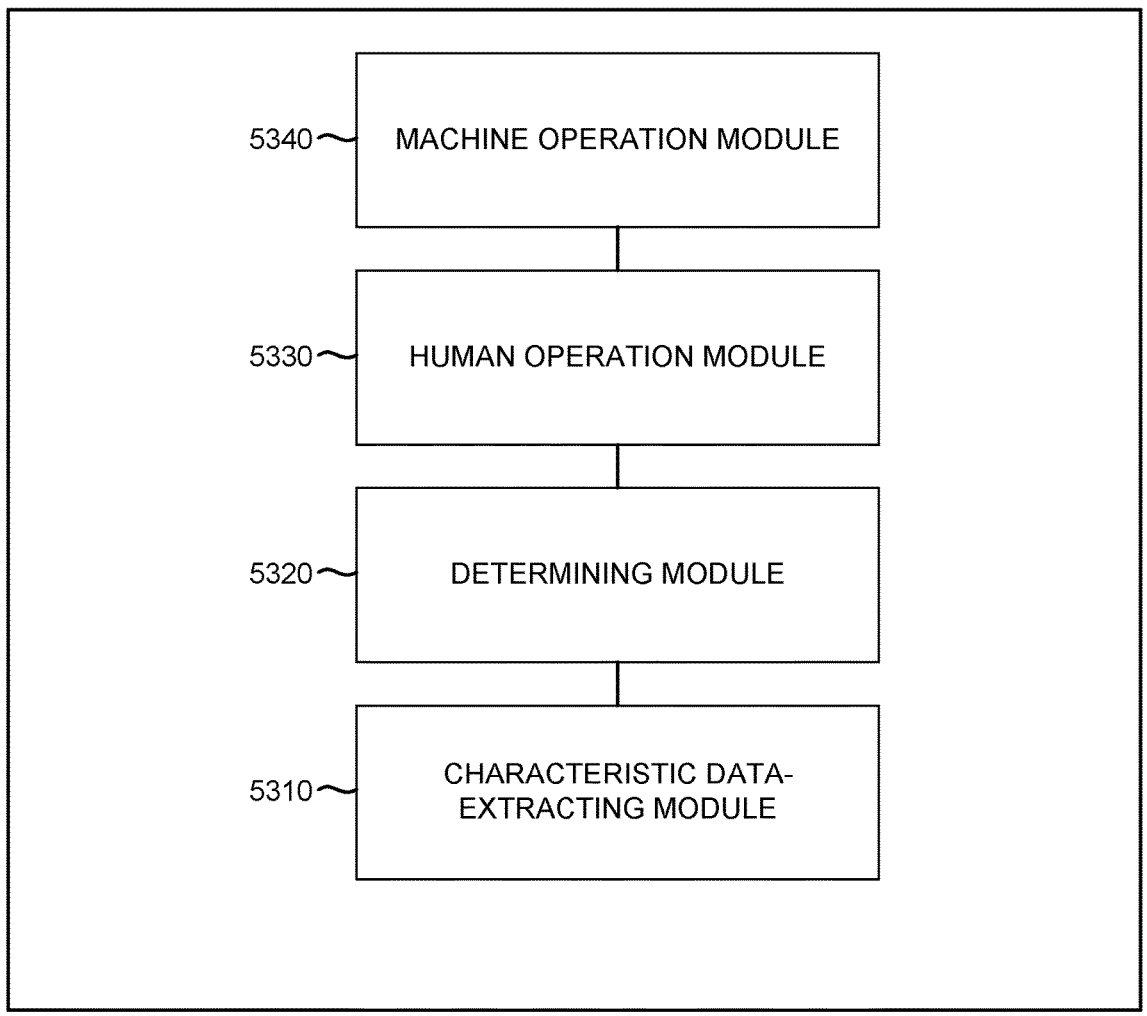
FIG. 5B is a structural block diagram of an embodiment of a first identification module.

FIG. 5B is a structural block diagram of an embodiment of a first identification module. In some embodiments, the first identification module 5300 is an implementation of the first identification module 530 of FIG. 5A and comprises: a characteristic data-extracting module 5310, a determining module 5320, a human operation module 5330, and a machine operation module 5340.

In some embodiments, the characteristic data-extracting module 5310 is configured to extract to-be-identified behavioral characteristic data of the second operation.

In some embodiments, the determining module 5320 is configured to determine whether the to-be-identified behavioral characteristic data conforms to a human operation or a machine operation In some embodiments, in the event that the to-be-identified behavioral characteristic data conforms to a human operation, the human operation module 5330 is configured to determine that the triggering entity of the second operation is human.

In some embodiments, in the event that the to-be-identified behavioral characteristic data relates to a machine operation, the machine operation module 5340 is configured to determine that the triggering entity of the second operation is a machine.

Referring back to FIG. 5A, in some embodiments, in the event that the result of the human or machine identification is a machine, the rejecting module 540 is configured to reject access requests subsequently sent by the machine.

In some embodiments, in the event that the result of the human or machine identification is a human, the responding module 550 is configured to respond to access requests subsequently sent by the human via the client.

Figure 6A:
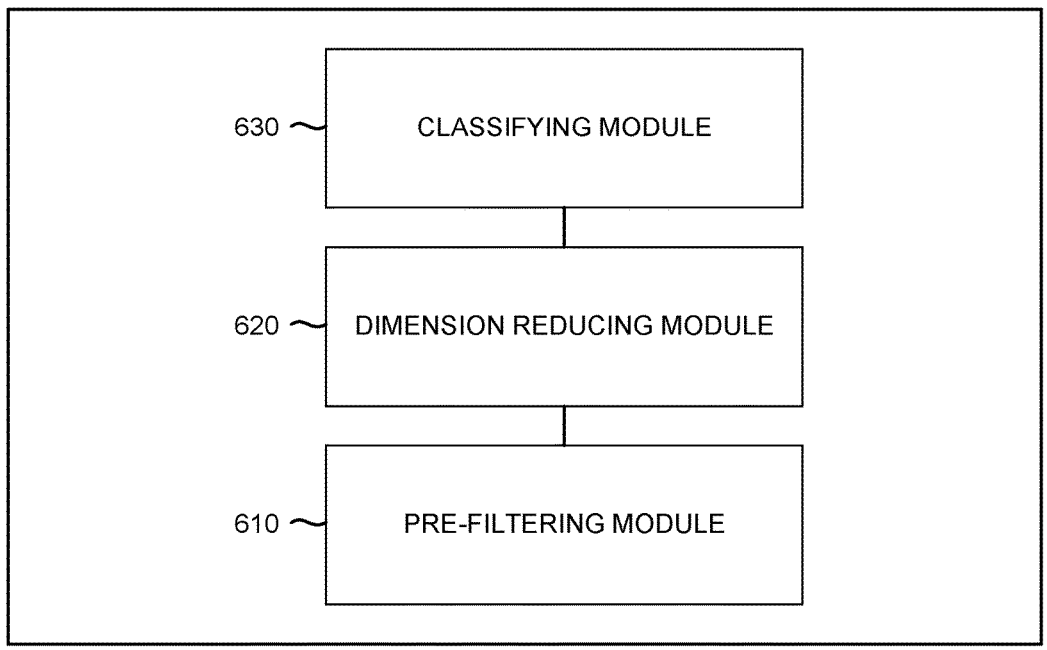
FIG. 6A is a structural block diagram of an embodiment of a device for training a behavioral characteristic model.

FIG. 6A is a structural block diagram of an embodiment of a device for training a behavioral characteristic model. In some embodiments, the device 600 is configured to implement the process 100 of FIG. 1A and comprises: a pre-filtering module 610, a dimension reducing module 620, and a classifying module 630.

In some embodiments, the pre-filtering module 610 is configured to pre-filter operation samples based on operation movement speed and degree of operation randomness of the operation samples.

In some embodiments, the dimension reducing module 620 is configured to reduce dimensions of the behavioral characteristic data of the pre-filtered operation samples based on a principal components analysis (PCA) algorithm.

In some embodiments, the classifying module 630 is configured to classify the dimension-reduced behavioral characteristic data based on a support vector machine (SVM) algorithm to obtain first behavioral characteristic data that conforms to human behavior and second behavioral characteristic data that conforms to machine behavior.

Figure 6B:
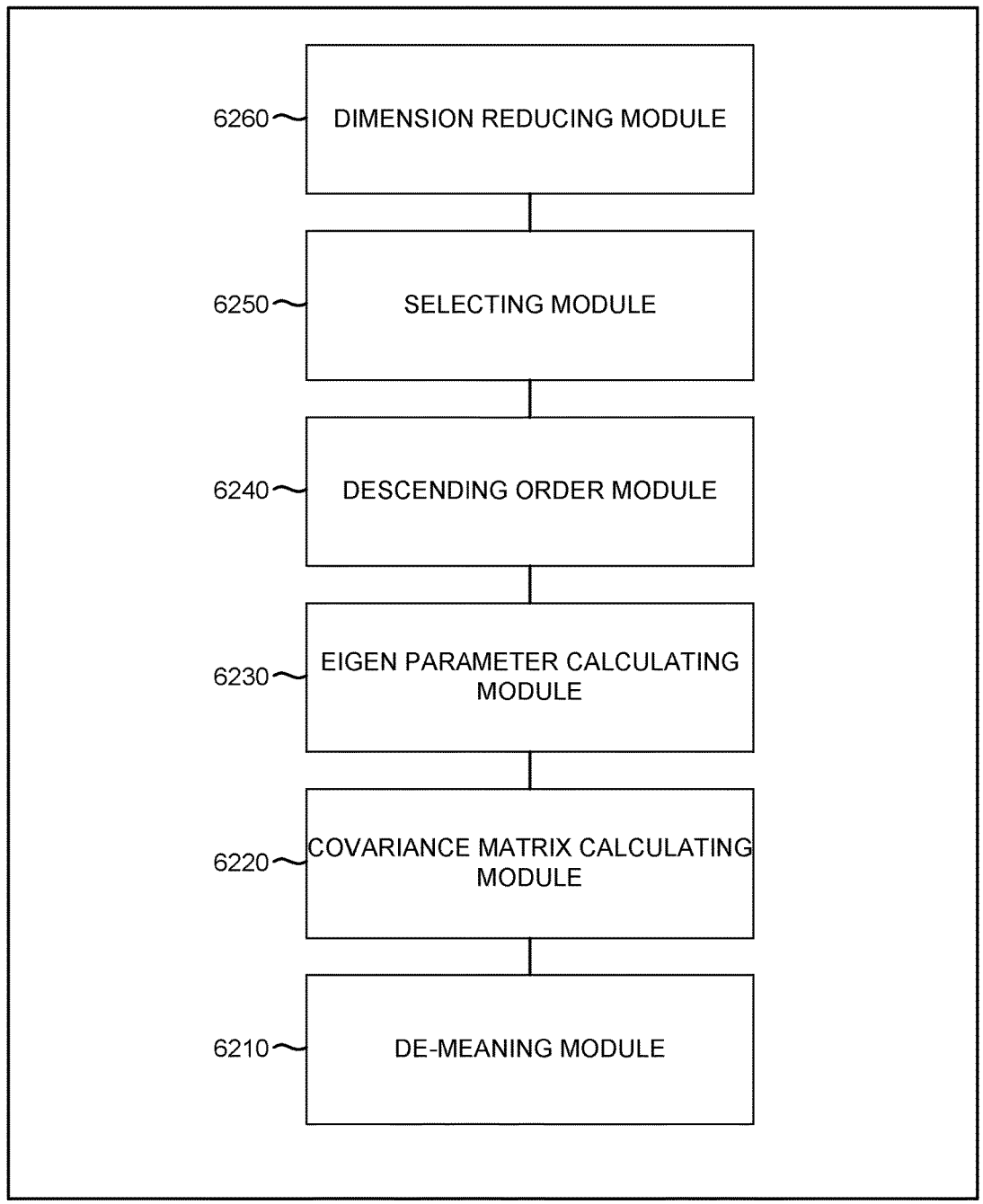
FIG. 6B is a structural block diagram of an embodiment of a dimension reducing module.

FIG. 6B is a structural block diagram of an embodiment of a dimension reducing module. In some embodiments, the dimension reducing module 6200 is an implementation of the dimension reducing module 620 of FIG. 6A and comprises: a de-meaning module 6210, a covariance matrix calculating module 6220, an eigen parameter calculating module 6230, a descending order module 6240, a selecting module 6250, and a dimension reducing module 6260.

In some embodiments, the de-meaning module 6210 is configured to de-mean the behavioral characteristic data of the pre-filtered operation samples.

In some embodiments, the covariance matrix calculating module 6220 is configured to calculate a covariance matrix of the de-meaned behavioral characteristic data.

In some embodiments, the eigen parameter calculating module 6230 is configured to calculate covariance eigenvalues and eigenvectors of the behavioral characteristic data based on the covariance matrix.

In some embodiments, the descending order module 6240 is configured to rank the behavioral characteristic data in descending order based on the covariance eigenvalues.

In some embodiments, the selecting module 6250 is configured to select, from the ranked behavioral characteristic data, the first N pieces of behavioral characteristic data as a dimension-reducing matrix, where N is an integer greater than or equal to 1.

In some embodiments, the dimension reducing module 6260 is configured to reduce the dimensions of the behavioral characteristic data based on the dimension-reducing matrix.

Figure 6C:
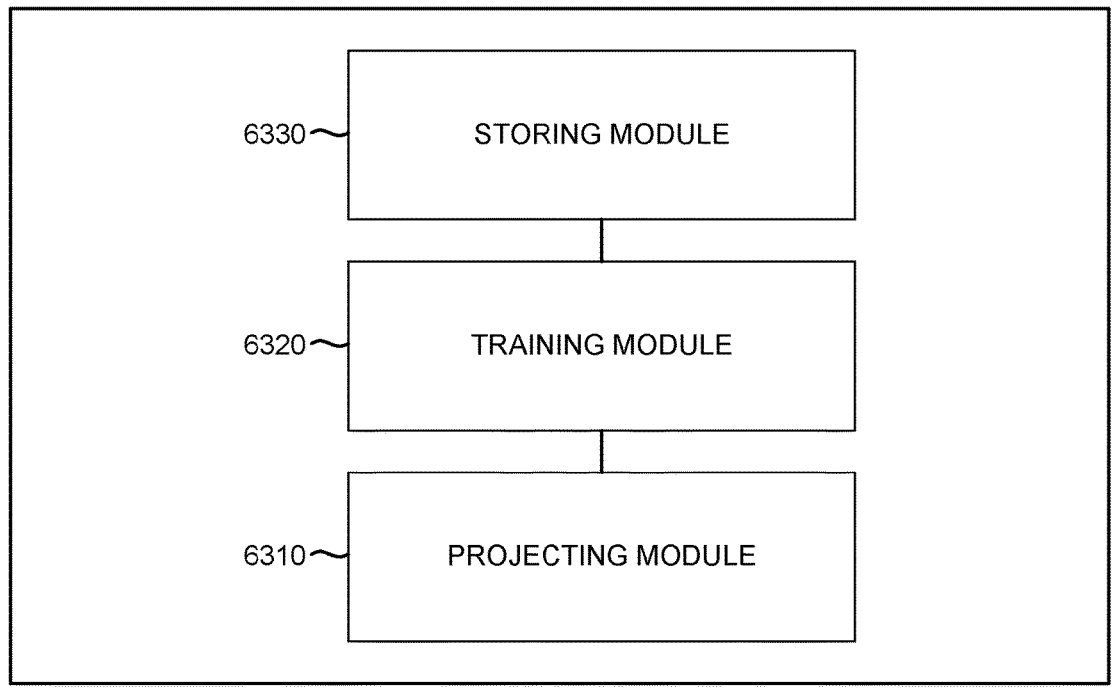
FIG. 6C is a structural block diagram of an embodiment of a classifying module.

FIG. 6C is a structural block diagram of an embodiment of a classifying module. In some embodiments, the classifying module 6300 is an implementation of the classifying module 630 of FIG. 6A and comprises: a projecting module 6310, a training module 6320, and a storing module 6330.

In some embodiments, the projecting module 6310 is configured to project dimension-reduced behavioral characteristic data onto a higher-dimensional space based on a mapping function.

In some embodiments, the training module 6320 is configured to train support vector machines based on sample data of the projected behavioral characteristic data.

In some embodiments, the storing module 6330 is configured to store training results as a classifier for human operations and machine operations.

Figure 7:
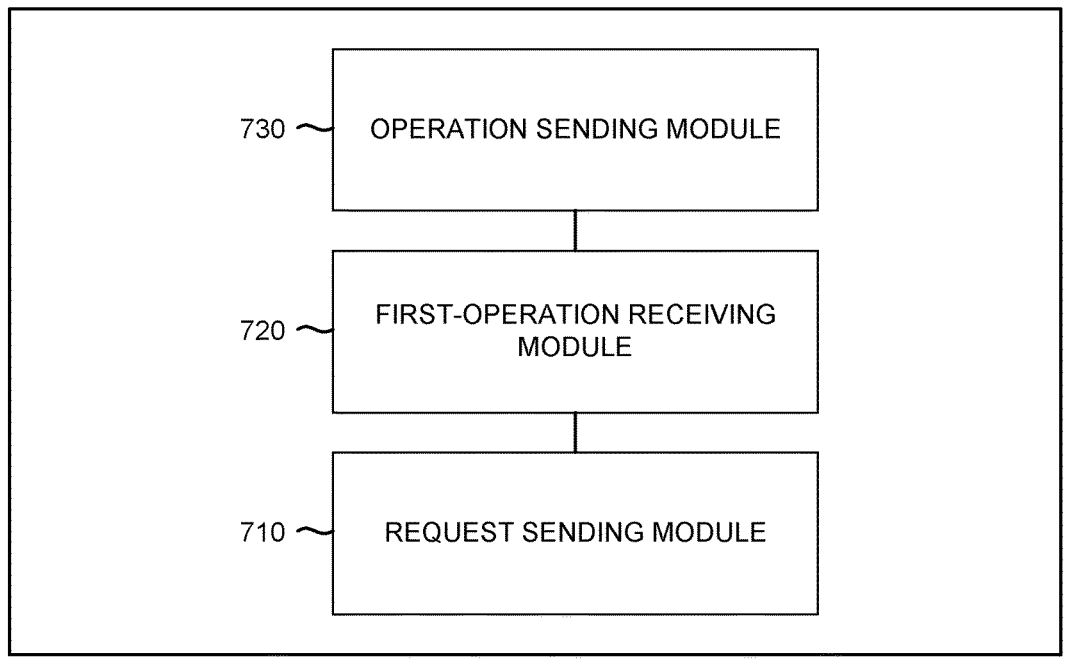
FIG. 7 is a structural block diagram of an embodiment of a device for collecting behavioral characteristic data.

FIG. 7 is a structural block diagram of an embodiment of a device for collecting behavioral characteristic data. In some embodiments, the device 700 is configured to implement the process 300 of FIG. 3 and comprises: a request sending module 710, a first-operation receiving module 720, and an operation sending module 730.

In some embodiments, the request sending module 710 is configured to send a currently-triggered human or machine identification request to a server.

In some embodiments, the first-operation receiving module 720 is configured to receive a first operation rendered by the server in response to the human or machine identification request and used for human or machine identification. In some embodiments, the first operation expresses an operation track for identifying a human or machine.

In some embodiments, the operation sending module 730 is configured to send a second operation, which was triggered based on the first operation, to the server to identify a human or machine on the triggering entity for the second operation based on a behavior characteristic model that was set in advance. In some embodiments, the behavior characteristic model is: a classifier for human operations and machine operations that is trained based on operation samples.

In some embodiments, the client triggers the second operation based on the first operation sent by the server, and the first operation presents an operation track for identifying a human or machine. Then, after the client submits the second operation, the server, based on a pre-trained behavioral characteristic model, identifies a human or machine on the triggering entity for the second operation. In other words, the server determines whether the triggering entity for the second operation is a human or a machine. For example, when users perform mouse operations or triggering operations, the users have their own characteristics. For example, the users are accustomed to swiping based on a certain speed, cannot avoid wavering during the swiping process, etc. Therefore, the client can determine whether the second operation was triggered by a human or a machine based on the second operation behavioral characteristic data. Thus, the device can identify a human or machine more accurately than conventional devices and thus can further increase network security by rejecting machine access requests, but also can improve user experiences because the user can directly trigger a second operation based on the first operation.

Figure 8:
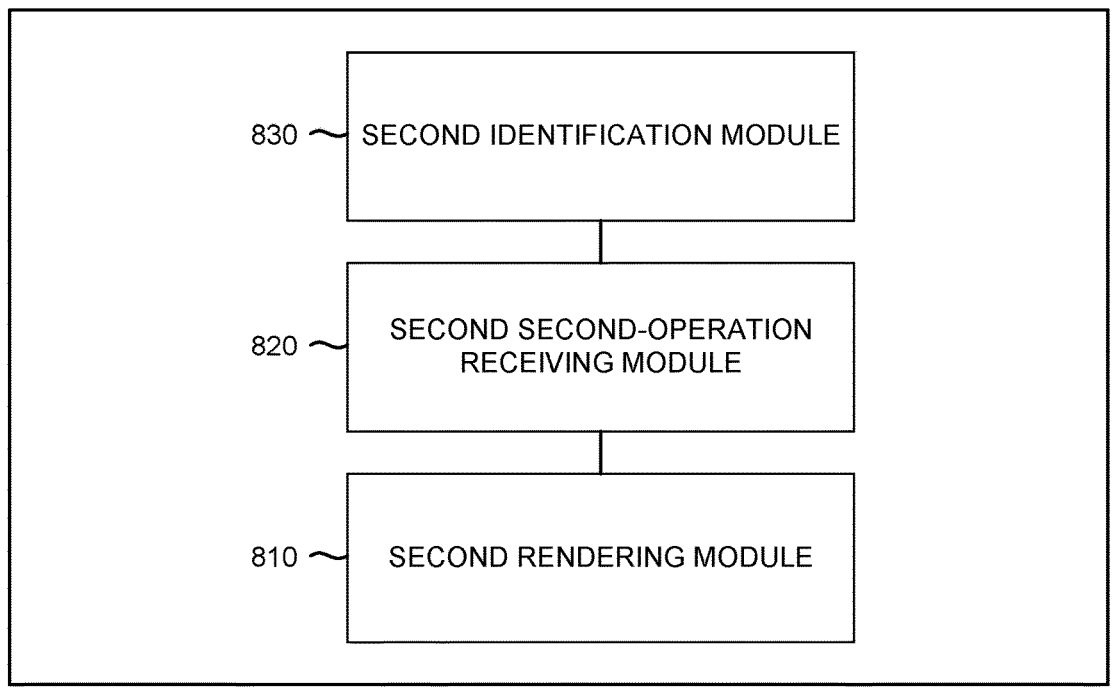
FIG. 8 is a structural block diagram of another embodiment of a device for identifying a human or machine.

FIG. 8 is a structural block diagram of another embodiment of a device for identifying a human or machine. In some embodiments, the device 800 is configured to implement the process 400 of FIG. 4 and comprises: a second rendering module 810, a second second-operation receiving module 820, and a second identification module 830.

In some embodiments, in the event that a currently-triggered human or machine identification request is received from a client, the second rendering module 810 is configured to render a first operation for human or machine identification to be sent to the client to be displayed.

In some embodiments, the second second-operation receiving module 820 is configured to receive a second operation that is triggered based on an operation track expressed by the first operation.

In some embodiments, the second identification module 830 is configured to identify a human or machine on the triggering entity for the second operation based on a behavior characteristic model that was set in advance. In some embodiments, the behavior characteristic model is: a classifier for human operations and machine operations that is trained based on operation samples.

In some embodiments, the triggering of the second operation is performed based on the first operation, and the first operation presents an operation track for identifying a human or machine. Subsequently, the second identification module 830 identifies a human or machine on the triggering entity for the second operation based on a pre-trained behavioral characteristic model. In other words, the second identification module 830 determines whether the triggering entity for the second operation is a human or a machine. For example, when users perform mouse operations or triggering operations, the users have their own characteristics. For example, the users are accustomed to swiping based on a certain speed, cannot avoid wavering during the swiping process, etc. Therefore, the second operation behavioral characteristic data can be used to determine whether the second operation was triggered by a human or a machine. Thus, the device 800 can identify a human or machine more accurately than conventional devices and thus can further increase network security by rejecting machine access requests, but can also improve user experiences because the user can directly trigger the second operation based on the first operation.

Figure 9:
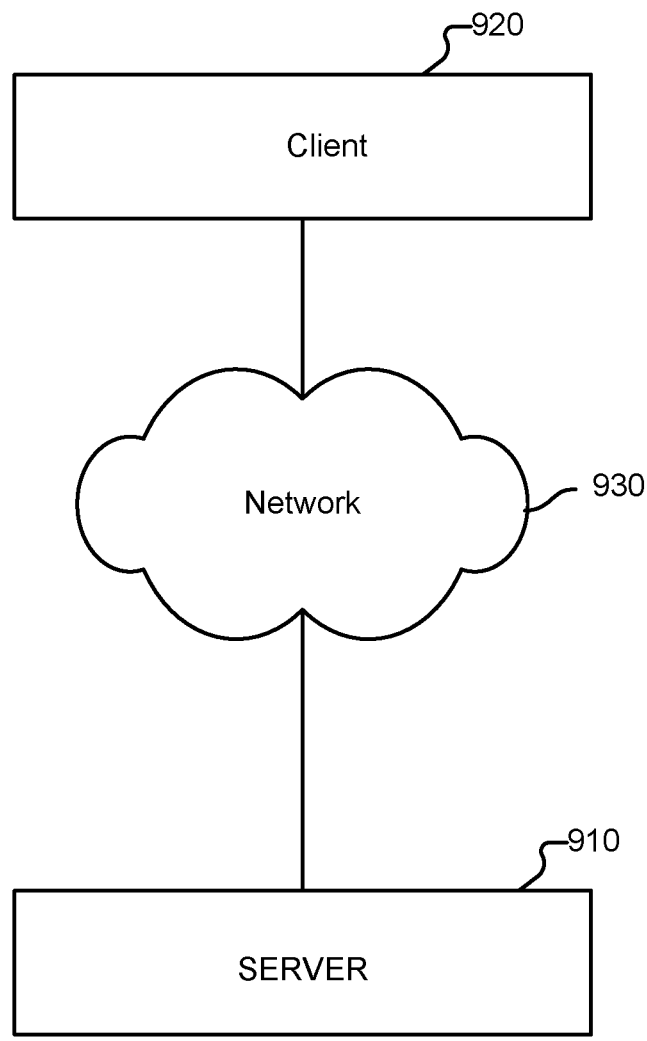
FIG. 9 is a diagram of an embodiment of a system for identifying a human or machine.

FIG. 9 is a diagram of an embodiment of a system for identifying a human or machine. In some embodiments, the system 900 includes a server 910 connected to a client 920 via a network 930.

In the event that a human or machine identification request is received from the client 920, the server 910 can render a first operation for human or machine identification to be sent to the client 920 to be displayed.

The server 910 can receive a second operation that is currently submitted by the client 920 and that is triggered based on the operation track expressed by the first operation.

The server 910 can identify a human or machine on the triggering entity for the second operation based on a behavior characteristic model that was trained in advance. In some embodiments, the behavior characteristic model corresponds to: a classifier for human operations and machine operations that is trained based on operation samples.

Figure 10:
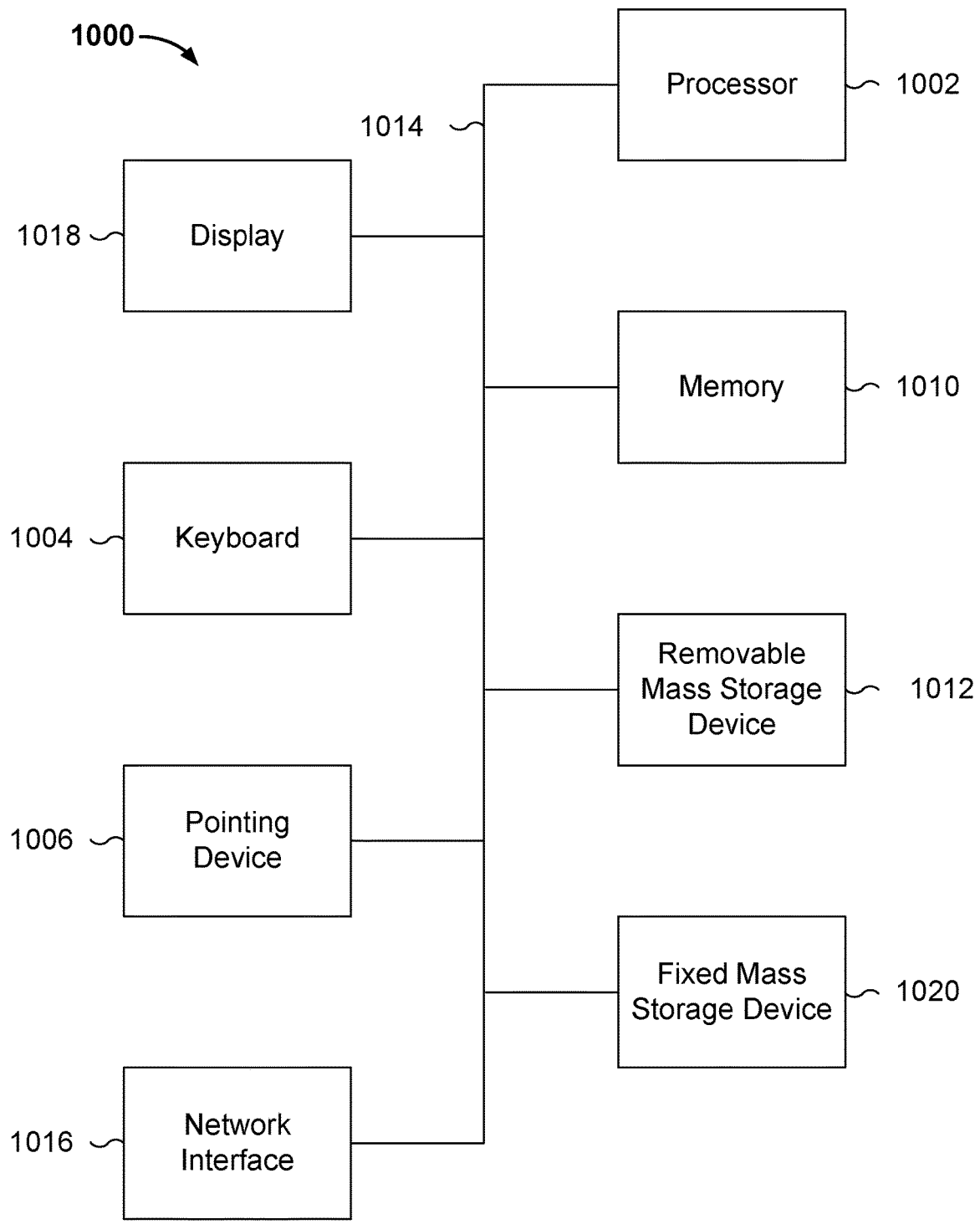
FIG. 10 is a functional diagram illustrating an embodiment of a programmed computer system for identifying a human or machine.

FIG. 10 is a functional diagram illustrating an embodiment of a programmed computer system for identifying a human or machine. As will be apparent, other computer system architectures and configurations can be used to identify a human or machine. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or uni-directionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storages 1012 and 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   in response to receiving a human or machine identification request sent by a client, sending information pertaining to a first operation configured to identify human or machine to the client to be displayed;
   receiving a second operation that is submitted by the client, the second operation being triggered in response to an interactive operation performed on an operation track associated with the first operation; and
   identifying a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises:
   extracting behavioral characteristic data of the second operation; and
   classifying the extracted behavioral characteristic data as either a human or a machine.

2. The method as described in claim 1, the operative slide time length being obtained by determining a total time length of valid operations of the operation samples.

3. The method as described in claim 1, wherein:
   the operative slide time length of the at least one segment is obtained based at least in part on:
   dividing a total operation time of the operation samples into a plurality of equal segments; and
   calculating a time length of the at least one segment;
   the center line-deviation frequency of the at least one segment is obtained based at least in part on:
   dividing the total operation time of the operation samples into a plurality of equal segments; and
   calculating a number of deviations from a center axis for the at least one segment; and
   the average deviation distance of the at least one segment is obtained based on:
   dividing a total operation time of at least one of the operation samples into a plurality of equal segments; and
   calculating a distance of deviations from the center axis for the at least one segment.

4. The method as described in claim 1, wherein:
   the operation triggering initial position and the operation triggering terminal position are obtained based on:
   determining coordinates in response to a determination that an operation sample begins to undergo triggering as the operation triggering initial position; and
   determining coordinates in response to a determination that the operation sample ceases to undergo triggering as the operation triggering terminal position.

5. The method as described in claim 1, wherein the identifying of the triggering entity for the second operation based on the behavior characteristic model comprises:

in response to a determination that the behavioral characteristic data conforms to a human operation, determining that the triggering entity of the second operation is human; and in response to a determination that the behavioral characteristic data conforms to a machine operation, determining that the triggering entity of the second operation is a machine.

6. The method as described in claim 1, further comprising:
after the identifying of the human or machine on the triggering entity for the second operation based on the behavior characteristic model that was set in advance:
in response to a determination that a result of the human or machine identification is a machine, rejecting access requests sent by the machine; and
in response to a determination that the result of the human or machine identification is a human, responding to access requests sent by the human.

7. A method, comprising:
displaying a first operation configured to identify a human or machine;
acquiring a second operation simulating an operation track presented by the first operation, wherein the second operation including behavioral characteristic data; and
sending the second operation to a server configured to identify a triggering entity of the second operation as either a human or a machine, wherein the server is configured to:
in response to receiving a human or machine identification request sent by a client, send information pertaining to a first operation configured to identify human or machine to the client to be displayed;
receive a second operation that is submitted by the client, the second operation being triggered in response to an interactive operation performed on an operation track associated with the first operation; and
identify a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises to:
extract behavioral characteristic data of the second operation; and
classify the extracted behavioral characteristic data as either a human or a machine.

8. A device, comprising:
one or more processors; and
one or more memories coupled with the one or more processors, wherein the one or more memories are configured to provide the one or more processors with instructions which when executed cause the one or more processors to:
in response to receiving a human or machine identification request sent by a client, send information pertaining to a first operation configured to identify human or machine to the client to be displayed;
receive a second operation that is submitted by the client, the second operation being triggered in response to an interactive operation performed on an operation track associated with the first operation; and
identify a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises to:
extract behavioral characteristic data of the second operation; and
classify the extracted behavioral characteristic data as either a human or a machine.

9. The device as described in claim 8, wherein the sending of the information pertaining to the first operation configured to identify human or machine to the client to be displayed comprises to:
determine that the triggering entity of the second operation is human in response to a determination that the behavioral characteristic data conforms to a human operation; and
determine that the triggering entity of the second operation is a machine in response to a determination that the behavioral characteristic data conforms to a machine operation.

10. The device as described in claim 8, wherein the one or more memories are further configured to provide the one or more processors with instructions which when executed cause the one or more processors to:
after the identifying of the triggering entity for the second operation as either human or machine based on the behavior characteristic model:
in response to a determination that a result of the human or machine identification is a machine, reject access requests subsequently sent by the machine; and
in response to a determination that the result of the human or machine identification is a human, respond to access requests subsequently sent by the human.

11. A device, comprising:
one or more processors; and
one or more memories coupled with the one or more processors, wherein the one or more memories are configured to provide the one or more processors with instructions which when executed cause the one or more processors to:
display a first operation configured to identify a human or machine;
acquire a second operation simulating an operation track presented by the first operation, wherein the second operation including behavioral characteristic data; and send the second operation to a server configured to identify a triggering entity of the second operation as either a human or a machine, wherein the server is configured to:
  in response to receiving a human or machine identification request sent by a client, send information pertaining to a first operation configured to identify human or machine to the client to be displayed;
  receive a second operation that is submitted by the client, the second operation being triggered in response to an interactive operation performed on an operation track associated with the first operation; and
  identify a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises to:
    extract behavioral characteristic data of the second operation; and
    classify the extracted behavioral characteristic data as either a human or a machine.

12. A computer program product being embodied in a tangible non-transitory computer readable storage medium and comprising computer instructions for:
  in response to receiving a human or machine identification request sent by a client, sending information pertaining to a first operation configured to identify human or machine to the client to be displayed;
  receiving a second operation that is submitted by the client, the second operation being triggered in response to an interactive operation performed on an operation track associated with the first operation; and
  identifying a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises:
    extracting behavioral characteristic data of the second operation; and
    classifying the extracted behavioral characteristic data as either a human or a machine.

13. A computer program product being embodied in a tangible non-transitory computer readable storage medium and comprising computer instructions for:
  displaying a first operation configured to identify a human or machine;
  acquiring a second operation simulating an operation track presented by the first operation, wherein the second operation including behavioral characteristic data; and
  sending the second operation to a server configured to identify a triggering entity of the second operation as either a human or a machine, wherein the server is configured to:
    in response to receiving a human or machine identification request sent by a client, send information pertaining to a first operation configured to identify human or machine to the client to be displayed;
    receive a second operation that is submitted by the client, the second operation being triggered in response to an interactive operation performed on an operation track associated with the first operation; and
    identify a triggering entity for the second operation as either a human or a machine based on a behavior characteristic model, wherein the behavior characteristic model includes a classifier for human operations and machine operations, and the classifier is trained based on operation samples, wherein behavioral characteristic data of the operation samples includes at least one of the following: operative slide time length, operative slide time length of at least one segment, center line-deviation frequency of at least one segment, average deviation distance of at least one segment, an operation triggering initial position, and an operation triggering terminal position, and wherein the identifying of the triggering entity comprises to:
      extract behavioral characteristic data of the second operation; and
      classify the extracted behavioral characteristic data as either a human or a machine.

* * * * *